May 22, 1923.
T. CHARLTON
ROTARY ENGINE
Filed Dec. 30, 1918
1,456,222
8 Sheets-Sheet 5
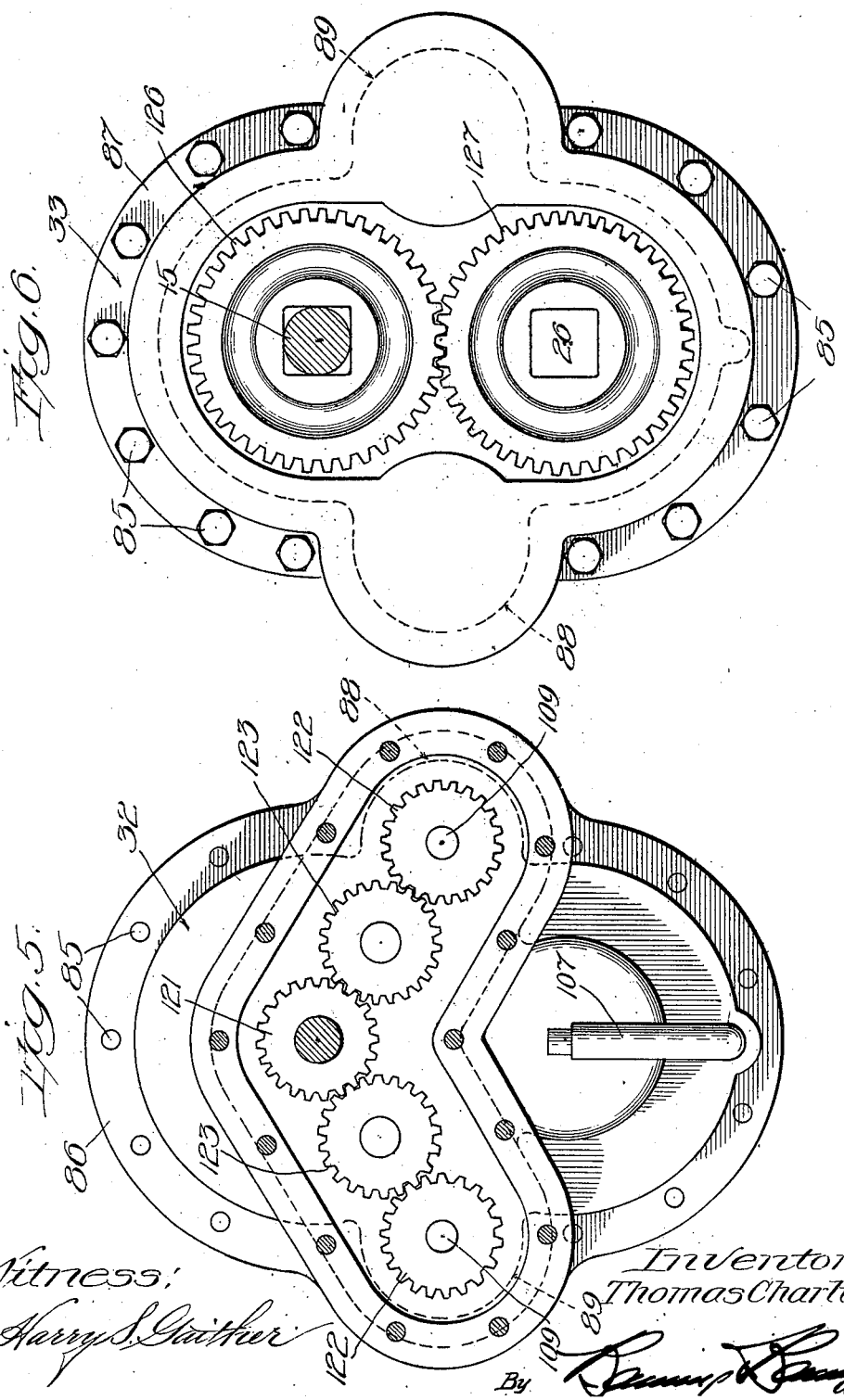

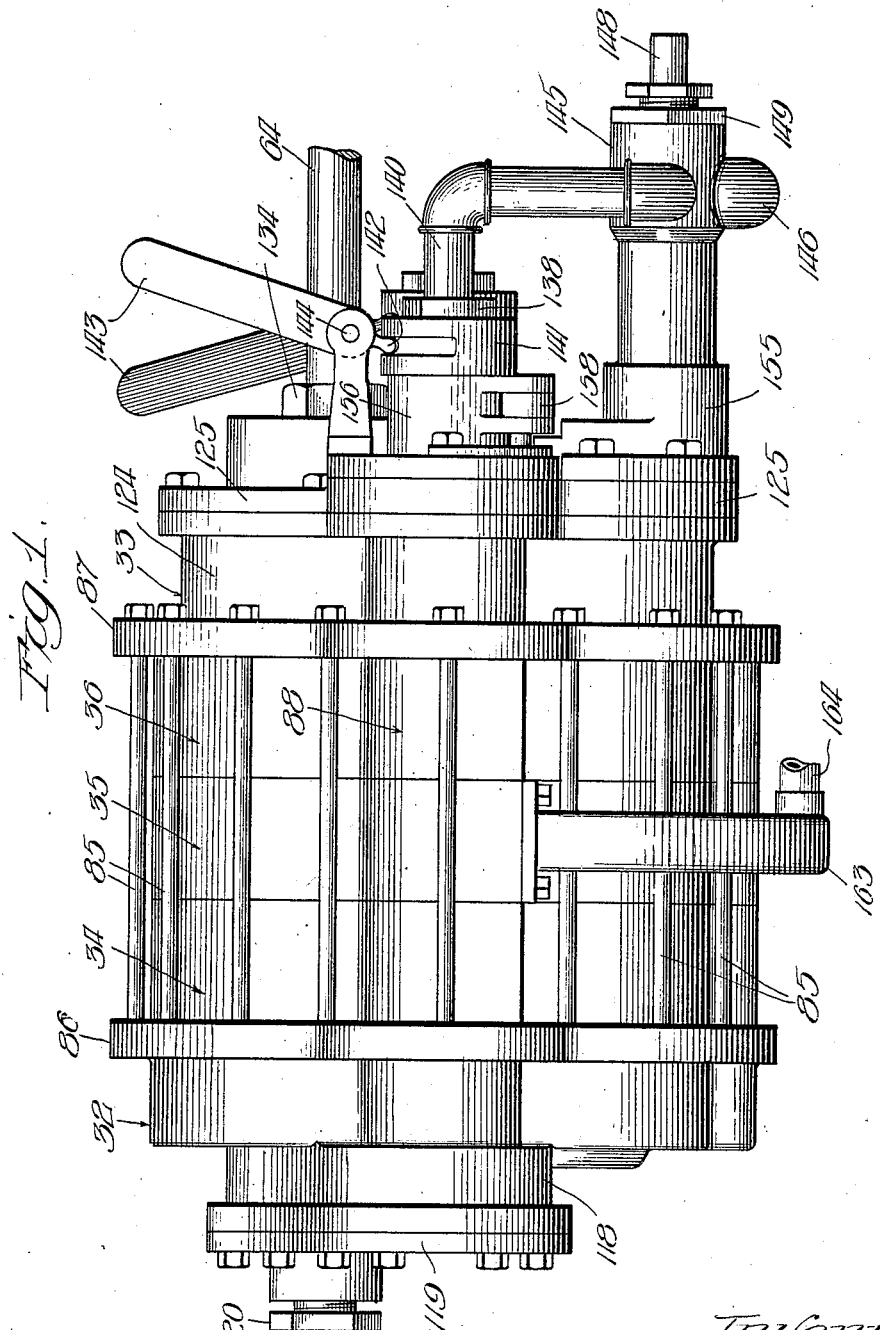

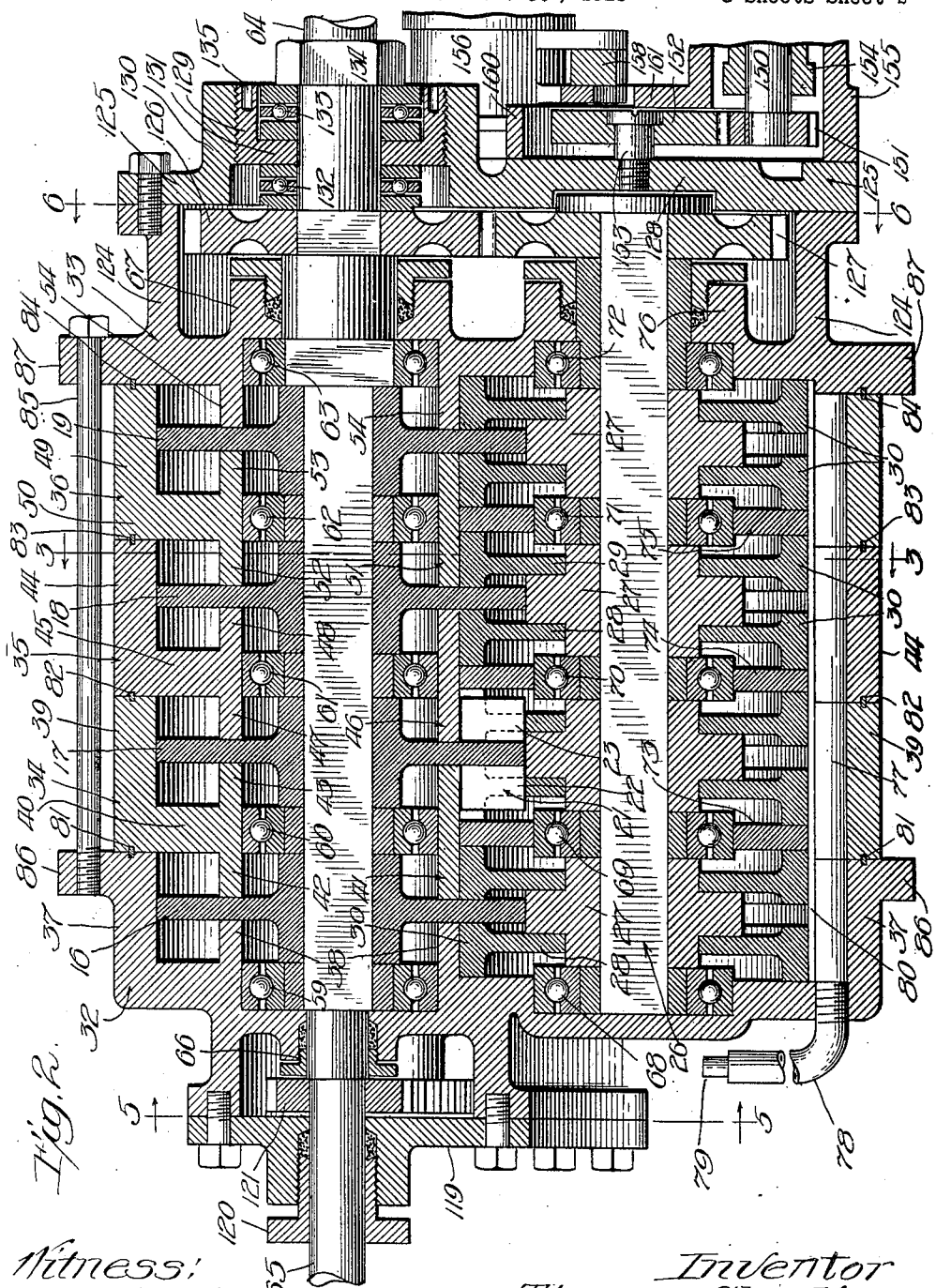

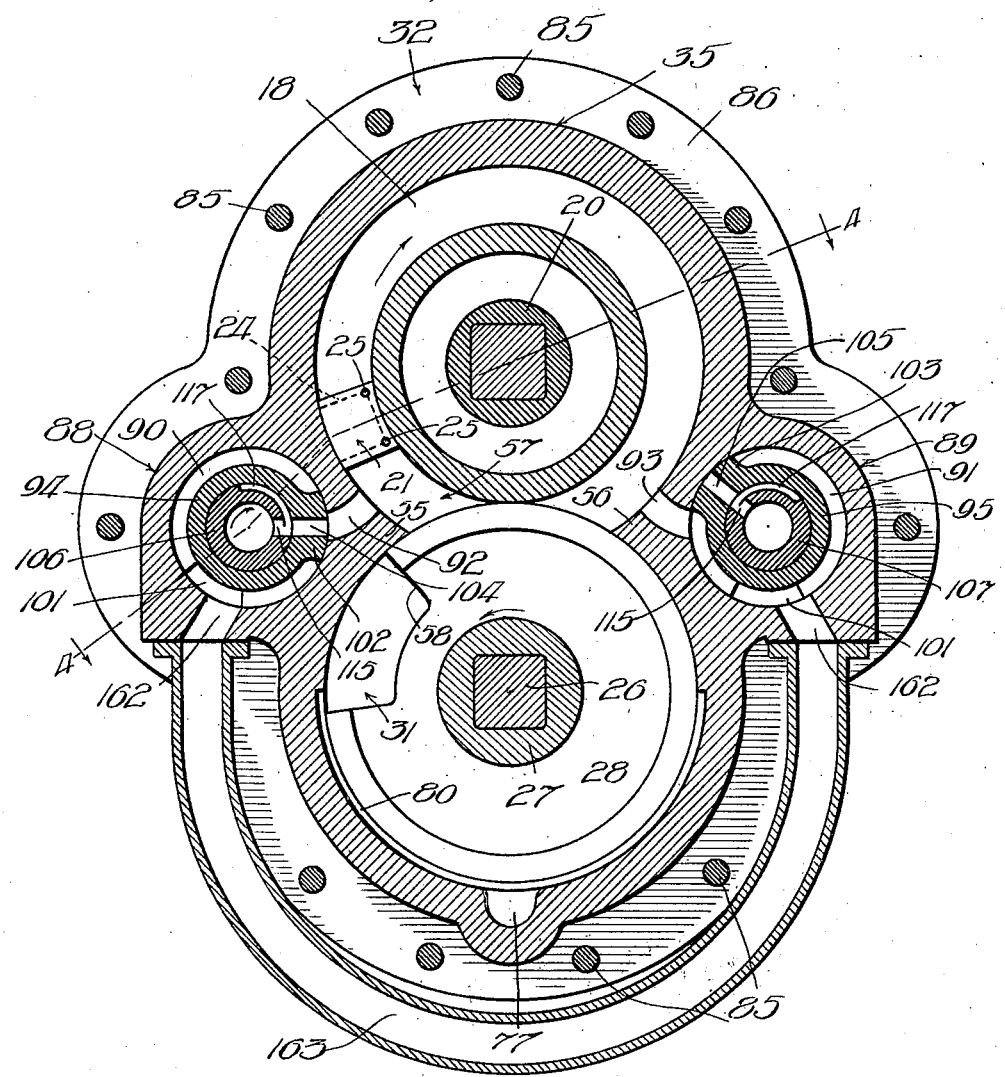

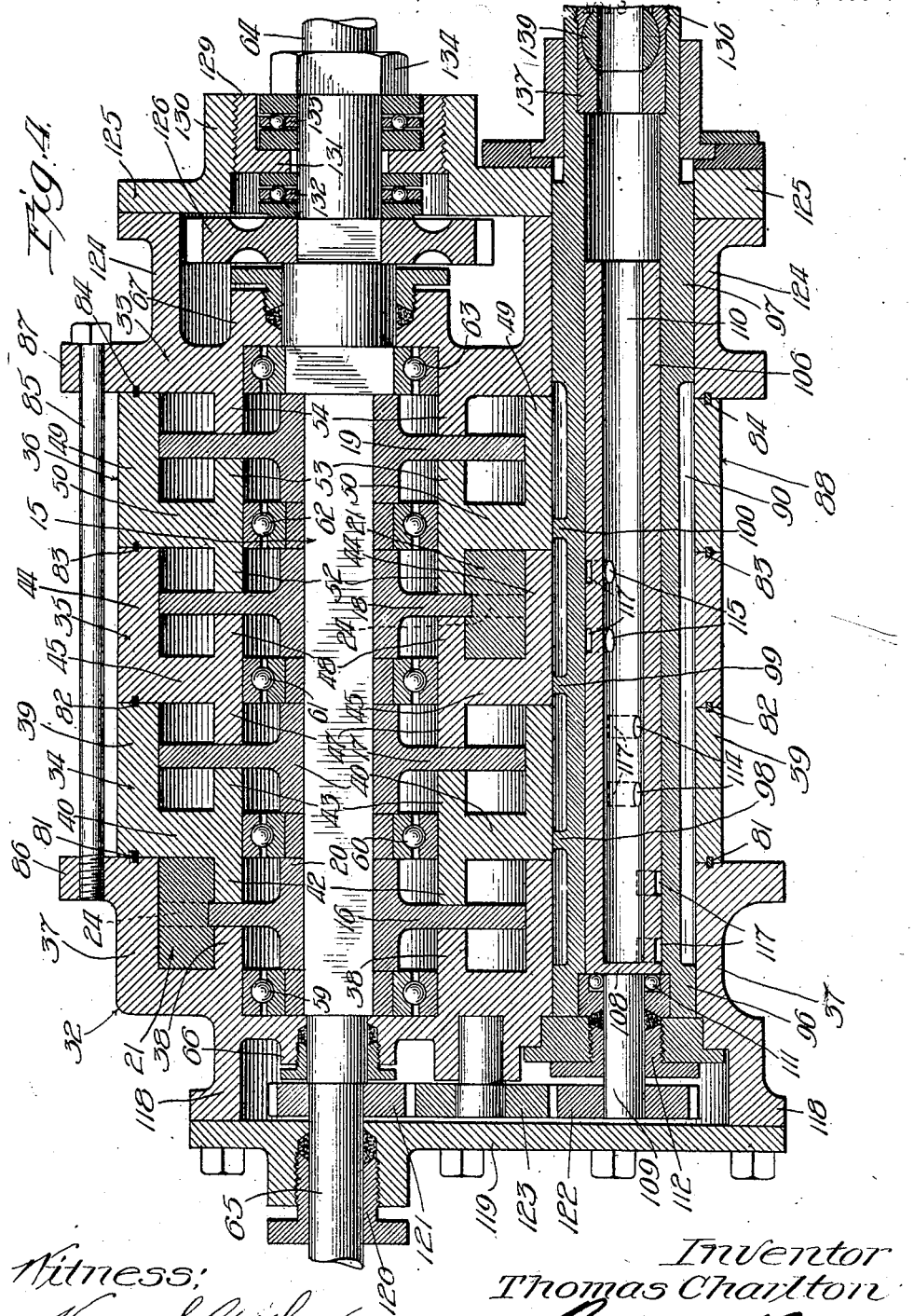

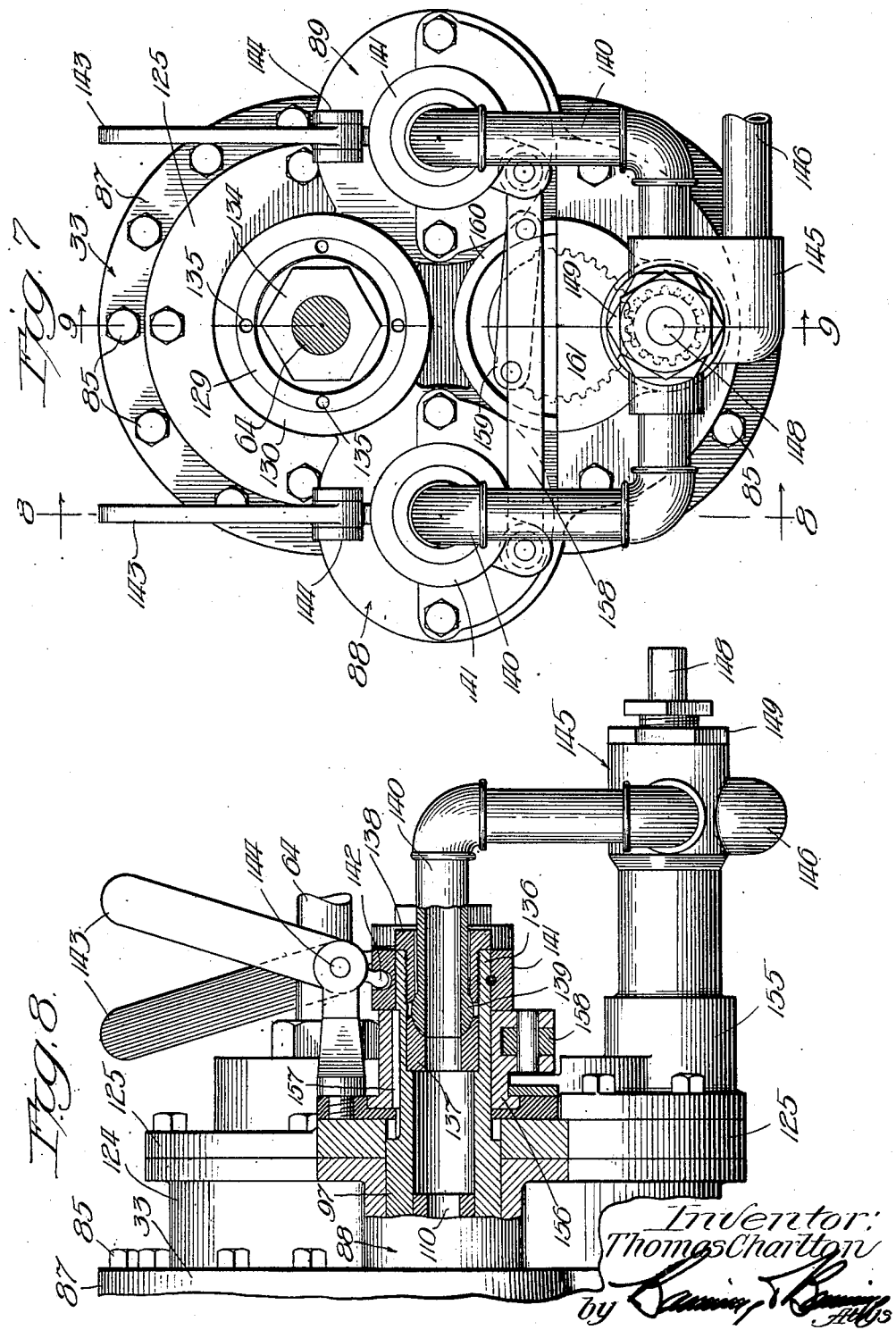

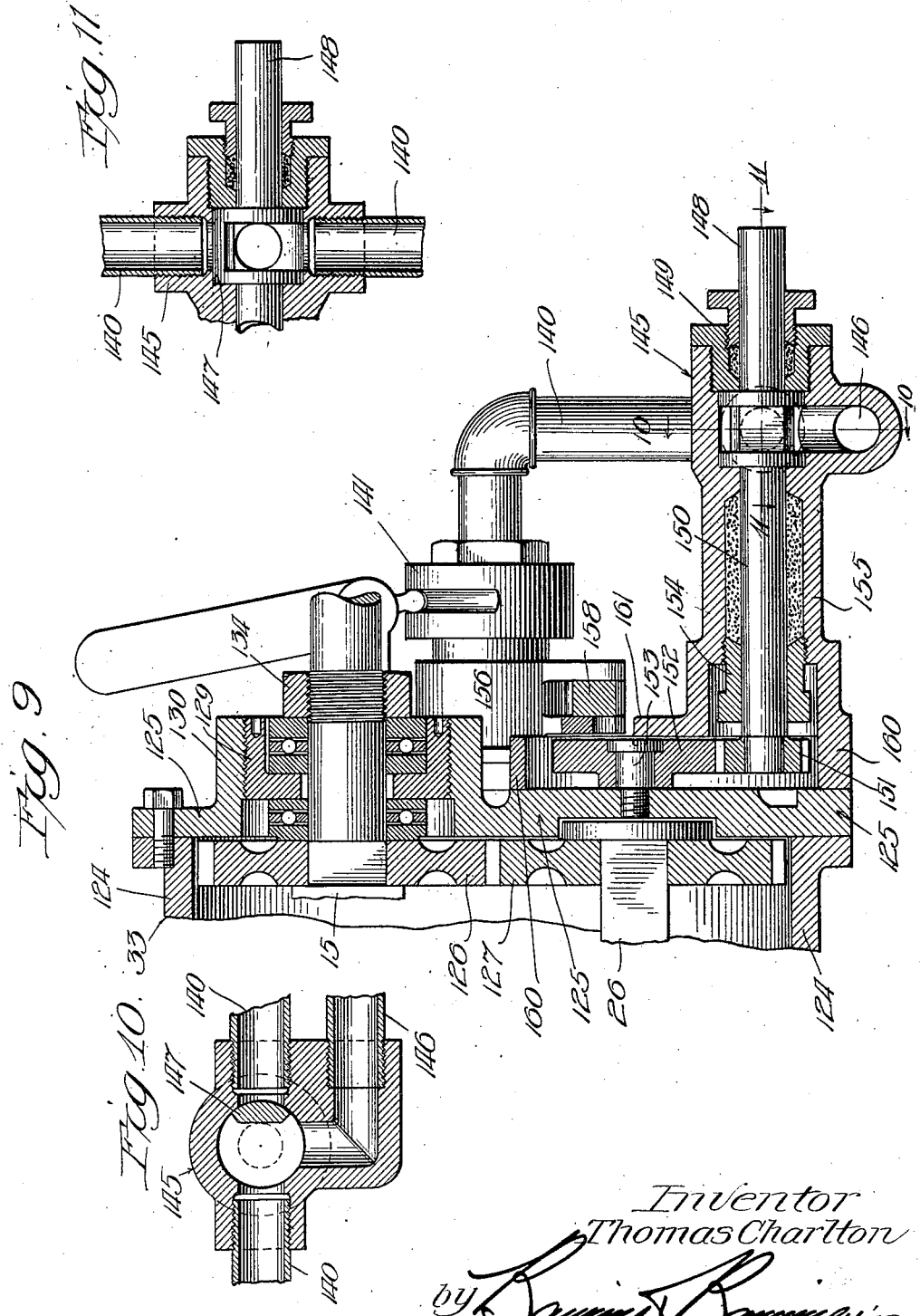

May 22, 1923.

T. CHARLTON

ROTARY ENGINE

Filed Dec. 30, 1918

Witness:
Harry S. Gaither

Inventor
Thomas Charlton
By

Patented May 22, 1923.

1,456,222

UNITED STATES PATENT OFFICE.

THOMAS CHARLTON, OF CHICAGO, ILLINOIS, ASSIGNOR, BY MESNE ASSIGNMENTS, TO GEORGE M. STUDEBAKER, OF SOUTH BEND, INDIANA.

ROTARY ENGINE.

Application filed December 30, 1918. Serial No. 268,860.

*To all whom it may concern:*

Be it known that I, THOMAS CHARLTON, a citizen of the United States, residing at Chicago, in the county of Cook and State of Illinois, have invented certain new and useful Improvements in Rotary Engines, of which the following is a specification.

This invention relates to improvements in rotary engines and has particular reference to improvements in rotary steam engines, although it will appear that the features of the invention are very well adapted for use in connection with rotary engines operating under other fluids than steam. Nevertheless since certain of the features have particular reference to the construction and operation of steam engines, I will explain the features of the invention as applied to this class of service, without thereby intending in any way to limit the construction or operation of the device except by way of such limitations as may be contained in the claims.

I will also state that the features of the present invention are very well adapted for use in connection with rotary steam engines operating on very high pressure and high temperature steam. Among other things, it may be stated that one of the objects is to provide a construction of engine which shall be very well adapted for automobile and traction service, wherein it is necessary to develop large amounts of power within relatively small machines operating intensively. In fact in such classes of service as this, pressures up to six or eight hundred pounds per square inch are frequently encountered, and superheats amounting in some cases to one hundred or two hundred degrees F. above the saturation temperature of the steam. Such pressures and superheats give temperatures of five hundred to six hundred degrees F. These conditions are such that it is very difficult and frequently impossible to adequately and successfully lubricate the moving parts to such an extent as would be necessary and satisfactory in ordinary types of construction. The machine of the present invention is also very well adapted for marine, locomotive, and general engineering service.

Another object of the invention is to provide a very perfectly balanced machine and one which shall be operable in an equally successful manner either forward or reverse. Also in this connection extremely simple and effective valve mechanisms for controlling the admission and cut-off of the steam or other working fluid in either direction of operation are provided. Another object is to very greatly reduce the lubricating problems and difficulties by so constructing the machine that the oil will be carried up continuously during the operation of the machine from a chamber or receptacle in the lower portion thereof to practically all of those parts subjected to the action of the steam. In this way, the live steam parts will at all times be thoroughly lubricated without the necessity of providing special devices and arrangements for accomplishing this result.

Another object of the present invention is to make suitable provision for working the machine at all times on the expansion principle so as to make available the expansive force of the steam as well as its dead pressure, thus making it possible to greatly increase the efficiency of the machine and lower its steam consumption per unit of energy delivered.

In this connection I will state that the features of the present invention are not by any means limited to use in vehicle and transportation service, but many of them may be very advantageously used in stationary service. When so used they may be used in conjunction with, or under the control of, cut-off governors of the ball or inertia types and at extremely high economy. This is because of the fact that when so used, the engine may operate with the steam expanding to a very high degree, and in fact to a much higher degree than in any type of stationary engine of which I am aware, because of the smaller cylinder areas, and very long strokes of my engine as compared to other types of stationary engine.

Since the clearances between the moving parts are necessarily very slight, it follows that means should be provided for very nicely adjusting the several parts in the first instance, so as to secure exactly the clearances desired, and, therefore, another object of the invention is to provide an extremely simple arrangement whereby the clearances and position of the rotating parts may be very nicely established and adjusted from time to time.

Another feature of this invention has to do with the mechanical construction and arrangement of certain of the parts of the machine with a view to making it possible to very cheaply and accurately construct them. Because of the very high steam pressures for which the machine is intended (among other things), it is desirable to use steel of very high tensile strength so as to reduce the size and weight of the parts as much as possible. This steel is difficult to work with various machine tools, and, therefore, it is very desirable to so design and arrange the parts that they can be finished and assembled by the use of very simple mechanical operations. In this construction another object is to so design and construct the machine as to largely standardize the form and construction of the various parts, thus making it possible to produce the engine from a minimum number of standard parts and at minimum cost.

Another object is to provide a very simple speed control for the engine and one which can be very simply and conveniently incorporated with the valve mechanism. That is to say this feature of the invention has to do not only with the provision of a simple means for controlling the speed and power of the engine, but also has to do with the relating and incorporating of this feature with the valve mechanism generally in a very simple and effective manner.

The foregoing are mentioned simply as comprising certain of the objects and advantages sought to be accomplished by the use of the features herein disclosed. Many other objects and uses of the invention will appear from a detailed description of the same which consists in the features of construction and combinations of parts hereinafter described and claimed.

In the drawings:

Figure 1 shows a side elevation of a machine embodying the features of my invention;

Fig. 2 shows a vertical longitudinal section through the machine of Fig. 1, on enlarged scale, and certain of the end portions being broken away so as to make it possible to make the figure on larger scale;

Fig. 3 is a vertical cross section taken on the line 3—3 of Fig. 2, looking in the direction of the arrows;

Fig. 4 is a longitudinal section through the machine in an angular direction, the same being taken on the line 4—4 of Fig. 3, looking in the direction of the arrows;

Fig. 5 is a view taken on the line 5—5 of Fig. 2, looking in the direction of the arrows, the cover plate over the valve operating gears having been removed or cut away;

Fig. 6 is a view taken on the line 6—6 of Fig. 2, looking in the direction of the arrows, the front controlling mechanism having been cut away or removed;

Fig. 7 is an end view of the machine looking at the power end thereof which I shall designate the back end for purposes of convenience;

Fig. 8 is a view taken on line 8—8 of Fig. 7 looking in the direction of the arrows, being of fragmentary section, and it shows certain of the operating or controlling mechanism;

Fig. 9 is a view taken on the line 9—9 of Fig. 7, looking in the direction of the arrows and it shows a fragmentary central vertical section through certain of the control devices;

Fig. 10 is a fragmentary section taken on the line 10—10 of Fig. 9 looking in the direction of the arrows;

Fig. 11 is a fragmentary horizontal section taken on the line 11—11 of Fig. 9, looking in the direction of the arrows.

Figure 12:
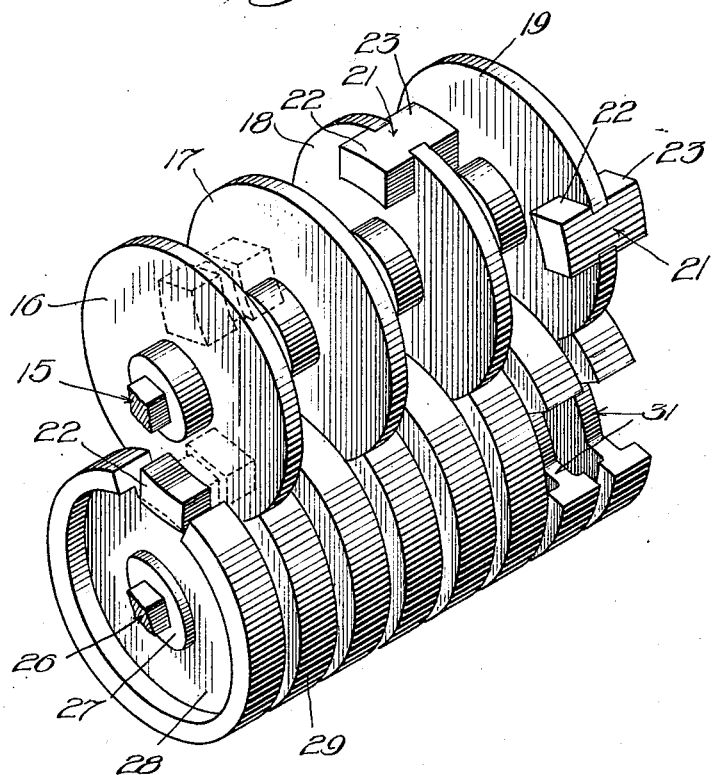
Fig. 12 is a perspective view of certain of the operating parts, showing in simple manner the relationship which they bear to each other.

Before proceeding to describe the embodiment of my invention shown in the drawings. I will state that the embodiment selected for illustration is shown in detail only by way of illustration and that manifestly the various features therein illustrated and which will be described may be embodied in other machines or embodiments than the one illustrated. The particular construction shown in the drawings is shown only by way of illustration and not as a matter of limitation.

Bearing the foregoing in mind, the machine illustrated comprises one or more driving disks mounted on a main shaft, and each is provided with a piston member or portion traveling in a substantially circular chamber in conjunction with a suitable traveling abutment with which each disk and piston co-operates, each abutment being provided with a suitable recess or opening adapted to pass the piston from one side to the other at the proper or appropriate time in each cycle of movements. All of the foregoing is in conjunction with suitable valve mechanism for regulating the admission and discharge of the steam and for controlling its cut-off as well as controlling the direction of rotation.

The particular embodiment selected for illustration includes the main shaft 15 carrying four disks 16, 17, 18, and 19. Each of these disks has a central hub section or portion drivingly mounted on the shaft 15, and a convenient construction is one in which that portion of the shaft carrying the hub sections 20 is squared or angular in formation, so that the disks can be easily set in place in an operative manner.

Each of the disks carries near its periphery a piston member 21, and in the particular construction illustrated each piston member projects to both sides of the disk in the form of a pair of wings 22 and 23. A convenient construction is that illustrated in which each disk is provided with an inwardly extending slotted opening 24, best shown in Fig. 3, the piston member 21 being of full width for the provision of both of the wings 22 and 23 and having its central portion grooved or recessed and seated down into the slot 24. When so seated a pair of locking pins 25 may be set home so as to hold the piston firmly in place.

The embodiment illustrated also includes an abutment shaft 26 on which are mounted the rotary or traveling abutments which cooperate with the disks and pistons aforesaid. Each of these abutment members is conveniently built up in the form of a hub portion 27 on which are a pair of disk members 28 and 29. The peripheral portion of each disk member is shown as being widened out to provide a flange 30 so as to give it additional width, but not materially increasing its weight. Furthermore, by providing extra width in the abutment disks as compared to the driving pistons and chambers, assurance is had that the chambers will be tightly closed by the peripheral portions of the abutment disks, by the overlap so secured. The abutment disks 28 and 29 are secured to their hub 27 in any convenient manner, so that they rotate with the abutment shaft 26. The shafts 15 and 26 are driven in unison by suitable mechanism to be presently described. The rotating abutments are provided with peripheral slots or openings 31 best shown in Fig. 3 so shaped and positioned that as the abutment disks rotate in harmony with the driving disks and pistons, the pistons themselves will take into and pass through the slotted openings 31 in order to complete their revolution or cycles of movements.

As previously stated each piston travels in a circular chamber and I will now describe the construction illustrated for providing said chambers. This construction includes a front head member 32, a back head member 33, and intermediate chamber members 34, 35, and 36. Each of these members is of generally oval formation so as to constitute not only the chambers in which the driving disks and pistons travel, but also chambers in which the abutments operate. The head members 32 and 33 also carry certain bearing and other mechanism presently to be described.

The front head 32 has a rearwardly projecting peripheral flange 37 which substantially encloses the operating mechanisms of what I will designate as the No. 1 or forward cylinder. This head member 32 also carries a rearwardly projecting circular flange 38 which extends rearwardly to the position occupied by the driving disk 16 of cylinder No. 1. In conjunction with the peripheral flange 37 this flange 38 provides a circular chamber, broken in its lower portion, within which travels the front half of the piston block of No. 1 cylinder. The flange portion 30 of the front abutment disk 28 of No. 1 cylinder also travels in contact with the extreme lower portion of the outside face of this flange 38 as will be readily appreciated from an examination of Figs. 2 and 3.

The first intermediate or chamber member 34 is provided with a peripheral flange portion 39 of generally oval shape which encloses the outer portions of the working cylinders and the abutment chambers of cylinder No. 2. This intermediate section also has an inwardly projecting radial flange portion 40 which carries a circular flange 41, the upper portion thereof comprising the forwardly and rearwardly extending flange sections 42 and 43. This flange 41 provides in conjunction with the flange 40 of the member 34 and the flange 37 of the member 32 a circular chamber within which travels the rear half of the piston member 21 of cylinder No. 1. The lower portion of said flange 41 constitutes an abutment in contact with which the abutment disks 29 and 28 of cylinders Nos. 1 and 2 respectively travel.

The rear portion 43 of the flange 41 constitutes in conjunction with the rearwardly extending flange 39 and the member 40 of the chamber member 34 a circular chamber within which travels the front half of the piston member 21 of cylinder No. 2.

The chamber member 35 has a rearwardly projecting flange portion 41 of generally oval shape surrounding the working and abutment chambers of cylinder No. 3. In its upper portion the chamber member 35 has the downwardly depending portion 45 which carries a circular flange 46 having the forwardly projecting portion 47 and the rearwardly projecting portion 48. The forwardly projecting portion 47 of the circular flange 46 forms, in conjunction with the downwardly depending portion 45 and the rear portion 39 of the chamber member 34, a circular chamber within which travels the rear portion 23 of the piston 21 of cylinder No. 2. Also the peripheral portions of the abutment disk 29 of cylinder No. 2 and the abutment disk 28 of cylinder No. 3 travel in contact with the lower portion of the lower face of the flange 46.

The rear portion 48 of the flange 46 constitutes, in conjunction with the flange portion 44 and the downwardly depending member 45 of the chamber member 35, a circular chamber within which travels the forward half of the piston 21 of cylinder No. 3.

The chamber member 36 has a rearwardly projecting peripheral flange 49 of generally oval shape which encloses the working and abutment chambers of cylinder No. 4. In its upper portion this chamber member has a downwardly depending portion 50 which carries a circular flange 51 having the forwardly projecting portion 52 and the rearwardly projecting portion 53. The forwardly projecting portion 52, in conjunction with the downwardly projecting portion 50 of the chamber member 36 and the flange 44 of the chamber member 35, constitutes a circular chamber within which travels the rear portion of the piston 21 of cylinder No. 3. Also the peripheral portion of the abutment disk 29 of cylinder No. 3 and the peripheral portion of the abutment disk 28 of cylinder No. 4 travel against the lower surface of the flange 51.

The rear portion 53 of the flange 51 constitutes, in conjunction with the flange 49 and the downwardly depending portion 50 of the chamber member 36, a circular chamber within which travels the forward portion of the piston 21 of cylinder No. 4.

The rear head 33 has a forwardly projecting circular flange 54 which provides, in conjunction with said head, and in conjunction with the flange portion 49 of the chamber member 36, a circular chamber within which travels the rear portion of the piston of cylinder No. 4. Also the abutment disk 29 of cylinder No. 4 travels in contact with the lower surface of this flange 54. The flanged portion of each of the disks 16, 17, 18, and 19 travels between the peripheral flange portions of the corresponding abutment disks in a substantially steam-tight manner. Each pair of abutment disks, as previously explained, has its peripheral portion notched or recessed as at 21 in order to pass the corresponding piston each time the same comes around in a cycle of movements. The peripheral flange portion of each of the cylinder or chamber members is carried as far inwardly as may be at the points 55 and 56. This extreme distance is in each case determined by the points of intersection of the peripheral circles of the chambers within which the pistons and abutments rotate.

The operations of the main shaft 15 and the abutment shaft 26 are so harmonized and synchronized, and the recesses or notches 31 are so placed that almost immediately after the piston 21 leaves its recess in the direction of travel then taking place, the back wall of said recess travels beneath the portion 55 or 56 so as to close or seal a steam chamber 57. For example in Fig. 3, the working shaft 15 is shown as traveling in a clockwise direction and the abutment shaft 26 in a counter-clockwise direction. At the instant illustrated, the rear face 58 of the notch 31 has traveled slightly past the corner of the portion 55, and the piston 21 has traveled upwardly a slight distance in its working chamber so as to provide a steam space 57. Manifestly if the rotation were in the opposite direction, similar operations would take place at the other side of the machine.

In the particular embodiment illustrated in the drawing, there are provided four driving disks with their pistons and four corresponding sets of abutment disks. Manifestly the exact number used in any case will depend upon the choice of the designer and the conditions under which the engine is intended to operate. Ordinarily it will be desirable to secure as uniform a torque or driving force as possible, and for this purpose the admission of live steam to the various working or driving pistons should take place in proper sequence, and the live steam should in each case be carried such a distance in the rotation as will ensure a practically constant driving torque from piston to piston.

It will be observed that the abutment member for each working piston comprises in effect two separate and distinct disks mounted on a common hub. This design is adopted largely as a matter of convenience in construction, and also for the purpose of securing accuracy in construction and operation. Manifestly the clearance between the inner edges of the flange portions of the two abutments should be very accurately determined so as to accommodate the width or thickness of the corresponding driving disk in a steam tight manner without, however, exerting any unnecessary binding action. This will mean accuracy in design and construction. If both of the disks were cast integral and slotted afterwards, the probabilities would be that the internal stresses in the metal itself would cause a certain amount of warping, so that it would practically be impossible to secure a perfectly operating construction. By constructing the disks separate from each other and then mounting them on a common hub, any internal strains or stresses in the metal are largely eliminated, and furthermore the assembling of the parts will be greatly facilitated.

The working shaft 15 and the abutment shaft 26 may be mounted on any convenient form of bearings. In order to secure accurate and thoroughly satisfactory operation at very high speed, both of these shafts should be very rigidly and firmly supported in their bearings so that they will carry the large side thrusts to which they will be subjected without deflection or displacement.

It will be observed that the various flanges 38, 41 and 54 of the head and chamber sections provide a cylindrical chamber surrounding the working shaft 15 and having in its surface the annular slots which accommodate the various driving disks 16, 17, 18, and 19. The admission of steam into this inner chamber will be practically prevented so that the parts located therein will be operating without interference from steam. This chamber constitutes a very convenient and satisfactory space within which to mount a series of ball bearings 59, 60, 61, 62, and 63. The bearings 59 and 63 are located adjacent to the end portions of the rectangular section of the shaft and the bearings 60, 61 and 62 support the shaft at points intermediate the driving disks.

In the construction illustrated the bulk of the power is to be taken from the rear end 64 of the driving shaft 15, although, in some cases, it may be desirable to take a portion of the power from the front end 65 of said shaft. I have, therefore, shown said front end portion as being of reduced diameter and passing through a stuffing box 66 in the front head 32. The rear end portion 64 is of larger size and passing through a stuffing box 67 in the rear head 33.

It will be observed that the abutment disks with their shaft 26 and hubs 27 are located in a substantially cylindrical chamber enclosed within the lower portions of the end heads and the chamber members. This is also a practical steam tight chamber and constitutes a very satisfactory location for a series of ball bearings 68, 69, 70, 71 and 72 for the abutment shaft. The end bearings 68 and 72 are conveniently seated directly in the end heads 32 and 33, respectively, the intermediate bearings having their outer races carried by the disks 73, 74, and 75, respectively. The abutment shaft 26 passes through a stuffing box 76 in the rear or back head 33 so that its protruding end portion may be conveniently driven in a manner to be presently explained.

The cylindrical chamber, within which are located the abutment disks, abutment shaft, and abutment bearings, constitutes a very satisfactory chamber for the accommodation of the necessary lubricating oil for the driving disks and pistons as well as the abutment disks. For this purpose, the lower portions of the various casing sections are provided with a series of notches or grooves 77 which align with each other to produce a channel in the lower portion of the shell or housing. Lubricant may be introduced into this channel in any convenient manner, as by means of a tube 78, the outer end 79 of which is thereafter capped. Lubricant so introduced will fill in the lower portion of the housing so that the abutment disks will rotate at all times in an oil bath. This oil will be carried up by the disks and delivered in turn to the driving disks and pistons, and also to the various ball bearings and other moving parts. In order to facilitate the interchange of oil between the different parts the lower portion of the chamber sections may be enlarged as at 80 in Fig. 3.

The end heads and chamber sections may be aligned and held together in any satisfactory manner, but the arrangement illustrated is deemed to be peculiarly desirable. It includes a series of circular keys 81, 82, 83, and 84 joining together the consecutive sections and aligning them as well as rendering them steam tight, and the various sections are drawn together by a series of tie-bolts 85 extending between the projecting end portions 86 and 87 of the front and back heads, respectively.

Suitable valve mechanism must be provided for controlling the admission and discharge of steam to and from the driving pistons, and a suitable form of such valve mechanism will now be described. The various head and chamber sections are provided with side protuberances or projections 88 and 89, as best shown in Figs. 3, 5, 6, and 7. These are, in turn, provided with aligning or registering holes or openings 90 and 91 which together constitute a longitudinally extending passageway on each side of the machine. Fig. 4, being a section taken on line 4—4 of Fig. 3 looking in the direction of the arrows, clearly shows how this passageway is produced. Corresponding to each driving disk is a pair of ports 92 leading from the passage 90 and 93 leading from the passage 91. These ports are all located close to the upper or working surfaces of the abutment disks. The ports 92 of each pair are located on opposite sides of the corresponding driving disk, and communicate with the two faces thereof, and in like manner the ports 93 of each pair communicate with opposite faces of their driving disk. Consequently, by properly controlling both ports of each pair, steam will be simultaneously admitted to or released from both faces of each driving disk. Assuming the direction of rotation illustrated by the arrows in Fig. 3 to be the forward driving, the ports 92 will be the live steam ports and the ports 93 will be the exhaust ports. Manifestly for reverse driving, the functions of the ports will be relatively reversed.

Within the passages 90 and 91 are the reversing sleeves 94 and 95, respectively. These sleeves are provided with front and rear supporting portions 96 and 97, respectively, which work within the passages 90 and 91. They may also, if desired, be provided with intermediate flanges 98, 99, and 100, as shown in Figs. 3 and 4, although the presence of these flanges is not necessary except as a matter of convenience. However, when these flanges are provided they are conveniently slotted, as shown at 101 in Fig. 3, so as to facilitate the delivery of the exhaust steam from a single centrally located port in the manner to be presently explained.

The reversing sleeves 94 and 95 are provided with longitudinally extending lips 102 and 103, respectively, which lips work nicely against the inner surfaces of the passages 90 and 91, respectively. These lips are provided with ports 104 and 105 corresponding to all of the ports 92 and 93, respectively, so that upon turning either of the sleeves 94 or 95 into the position of the sleeve 94 in Fig. 3, its ports will be caused to register with the ports leading into the working compartments or cylinders. On the other hand by turning the sleeve into the position of the sleeve 95 of Fig. 3, all of the ports from the cylinders or working chambers will be thrown into communication with the passage 90 or 92, as the case may be, for the purpose of exhausting steam into such passage. It will be understood, therefore, that the position of the sleeve 94 is the driving position, whereas that of the sleeve 95 is the exhausting position.

Live steam is to be admitted to the interior of the sleeves 94 and 95 and to be controlled therein so as to admit live steam to the various cylinders in proper sequence. For this purpose the valve sleeves 106 and 107 are rotatably mounted within the reversing sleeves 94 and 95, respectively. The front end 108 of each of these valve sleeves is closed as shown in Fig. 4, and is provided with a driving connection 109, whereas its rear end 110 is left open for the admission of live steam. The front end 109 is conveniently mounted within a thrust ball-bearing 111 and pass through a stuffing box 112, which stuffing box will prevent the leakage of any steam over the end portion 109.

Each valve sleeve is provided with four sets of ports 113—113, 114—114, 115—115, and 116—116 (the ports 113—113 and 116—116 not being shown because they are cut away in the section shown in Fig. 4). These ports are set in quartering positions within their respective valve sleeves, so that they will successively come in position opposite to the ports 104 or 105 of the reversing sleeves with which they co-operate. For example, with the parts in the position shown in Fig. 3, the ports of the valve sleeve 106 will successively align with the ports 104 of said sleeve.

The valve sleeves rotate in the direction of the arrows shown in Fig. 3. In the position of the parts shown in said figure, the piston 21 of No. 3 cylinder has advanced a slight distance beyond the ports 92 of said cylinder, and the ports 115 of the corresponding valve sleeve are in full communication with the corresponding ports 104 of the corresponding reversing sleeve. The interval during which live steam will be admitted will depend upon the instant of cut-off of the ports 115, and in order to secure a perfectly uniform turning effort, the live steam should be carried a quarter stroke or revolution or slightly more in order to ensure a smooth transition from each cylinder to the next. This would mean that steam should be carried slightly more than one-fourth revolution in a four cylinder engine, and would necessitate the use of relatively long ports in the valve sleeves. In order to shorten up these ports and still secure the proper operation, I have shown the use of extensions or elongations 117 on the outer surfaces of the valve sleeves communicating with their respective ports and constituting in effect elongations of said ports. These elongations may be made of whatever length may be determined in order to secure the desired overlap from cylinder to cylinder.

The valve sleeves must be driven in synchronism or harmony with the driving shaft 15, and for this purpose I have provided suitable gear connections in the front head or casing of the machine. The space within which these gears are mounted is provided by the forwardly projecting flange 118 in conjunction with a cap plate 119 detachably mounted thereon. The forward extension 65 of the driving shaft 15 passes through a stuffing box 120 in the plate 119, but the forward extension of the valve sleeve terminates within the gear chamber and does not need to project beyond the same. A pinion 121 on the main shaft 15 drives a similar pinion 122 on the forward extension 109 through the medium of an idler 123, all of said pinions being located within the gear chamber. Such a set of pinions 122 and 123 meshing with the pinion 121 is provided at each side of the machine for the two valve sleeves as is clearly shown in Fig. 5. The pinions 122 are properly timed with respect to the pinion 121 so as to drive the valve sleeves in exact harmony or synchronism with the main shaft, and this means ordinarily that the pinions 122 will be of equal size with the pinion 121.

The abutment shaft 26 must be driven in harmony with the main shaft 15 ordinarily at equal speed therewith. For this purpose suitable gear connections are provided in the back end of the machine, which I will now explain. The back head 33 has a rearwardly projecting flange 124 which constitutes, in conjunction with the back head plate 125, a chamber within which are located the gears aforesaid. The driving gear 126 is mounted on the main shaft 15 and a following gear 127 meshing therewith is mounted on the abutment shaft 26. The abutment shaft terminates at the following gear 127, and the back head plate 125 is closed or capped outside of the gear 127 as shown at 128. On the other hand the main shaft 15 passes through the back head plate 125 in the rear extension 64.

In order to very nicely adjust the positions of the driving disks and pistons with respect to the chambers within which they work, and with respect to the abutment disks, I have provided an adjustable thrust bearing for the main shaft 15. For this purpose, a sleeve 129 is threaded into a flange 130 rearwardly projecting from the back head plate 128. This sleeve 129 has an inturned flange 131 which sits between front and rear thrust ball-bearings 132 and 133, respectively. The front thrust bearing 132 seats against the gear 126, and the rear thrust bearing 133 seats against a nut 134 or collar on the projecting portion 64 of the main shaft. By threading the sleeve 129 in or out by a spanner wrench working in the sockets 135, the main shaft may be set back and forth very accurately into whatever adjustment may be desired.

Live steam is to be admitted into the rear ends 110 of the valve sleeves, and this is conveniently done by admitting such live steam into the rear ends of the reversing sleeves. The reversing sleeves themselves are so mounted that they may be shifted longitudinally or axially of their lengths such a distance as to throw their ports 104 or 105, as the case may be, out of registry from the corresponding ports of the valve sleeves and the corresponding ports 92 or 93. In this way the steam openings may be varied from zero to a miximum, and a throttling action secured for controlling the operation of the machine without changing its valve. I have, therefore, provided mechanisms for permitting these adjustments, and simultaneously for delivering live steam into the back ends of the reversing sleeves, and for simultaneously, if desired, changing positions of the reversing sleeves in order to reverse the direction of rotation. All of these constructions I will now describe in detail.

The extreme rear end 136 of each of the reversing sleeves 94 and 95 is provided with a socket joint comprising a collar 137 in conjunction with a sleeve 138 and a ball joint 139 on a live steam pipe 140 which co-operates with said socket joint in the manner well understood in the art. The sleeve 138 is of such size as to permit of a slight amount of rocking movement of the live steam pipe 140 which takes place during the operation of controlling the steam. A collar 141 is located on the extreme protruding end of the reversing sleeve, said collar being provided with an elongated notch into which seats a finger 142 on a control lever 143. This control lever is pivoted to a stationary part 144. By swinging the control lever back and forth, the reversing sleeve will be shifted in and out, and the construction is such that this can be done whether the reversing sleeve stands in the forward running or reversing position.

The live steam pipes 140 from the two sides of the machine connect with a central valve mechanism 145 located in the lower rear portion of the machine. This central valve mechanism has an inlet connection 146 through which the steam is admitted in the first instance and has a reversing valve 147 which can be rocked through 180 degrees in order to deliver live steam to either side of the machine. This reversing valve 147 is mounted on a control shaft 148 which projects from a valve 145 through a stuffing box 149. By turning the projecting portion of the shaft 148, the steam will be thrown to one side or the other.

The shaft 148 also has an extension 150 on the forward end of which is a pinion 151 meshing with a gear 152, which gear is pivoted to the back cover plate 125, at the point 153. The forward extension 150 of the shaft 148 passes through a stuffing box 154 so as to prevent the escape of live steam into the space where the gears 151 and 152 are located.

As a matter of convenience in construction, the valve mechanism, shaft 148, and its forward extension 150 are all mounted within a rearwardly extending member 155 which can be secured to the lower rear portion of the back cover plate 125.

On the rear end 136 of each of the reversing sleeves 94 and 95, is secured a collar 156 by a key 157, so that by rocking said collar, the reversing sleeve will also be rocked. The collars 156 for the two reversing sleeves are joined together by a link 158 which, in turn, is operatively connected to the shaft 148 by means of the pinions 151 and 152 aforesaid. This is done by means of another link 159 having one end connected to the pinion 152 or a portion thereof, and its other end connected to the link 158. All of the parts are so related to each other that, upon turning the control shaft 148 through a sufficient angle to reverse the position of the valve 147, the positions of the reversing sleeves 94 and 95 will also be reversed. As a matter of convenience in design and construction, the rearwardly extending member 155 is provided with a flange portion 160, which seats against the back head plate 125. The lower portion of this flange 160 is covered over by a partition 161, so that the pinions 151 and 152 may be made to work in oil, if desired.

The steam which is exhausted into the passageways 90 and 91 is delivered from them through ports 162 and 163, respectively. These ports are conveniently formed in the lower portions of the projections 88 and 89, which lower portions are conveniently squared or shouldered as illustrated in Figs. 1 and 3. An exhaust manifold 163 in the form of a U-shaped pipe has its end portions taking steam from the ports 162 and 163. This exhaust manifold has a delivery connection 164 in its lower central portion on one side through which the exhaust steam will be delivered. By setting the manifold onto the projecting portions 88 and 89 in the position shown in Fig. 1, the exhaust steam will be delivered rearwardly, whereas by reversing the manifold the connection 164 will be thrown to the other side, so that it will face forward.

The amount of movement of each reversing sleeve under the influence of its control lever 143, in order to move from fully open position to fully closed position, is comparatively small, and similarly the amount of movement necessary in the pipes 140 will also be very small. If it should be found necessary to make special provision for the slight angularity in these pipes during such movement, this may be done either by providing for a slight amount of movement of the flange 160 on the back plate 125, or by provision of special flexible pipe sections or connections. Furthermore, this slight amount of movement will be permitted by reason of the fact that each of the pipes 140 is connected into the valve member 145 by the use of a nipple or the like.

The engine may be supported in any convenient manner, but the lugs or protuberances 88 and 89 will ordinarily constitute a very convenient portion of the engine for attachment to its foundation or support. For example, when the engine is to be mounted in the chassis of an automobile or truck, a suitable cradle may be provided to which the portions 88 and 89 will be attached and by which they will be carried. Inasmuch, however, as the particular method of support constitutes no portion of the present invention, I do not claim the same herein, but will do so in another suitable application for Letters Patent of the United States.

Furthermore, although in the present specification and drawings I have shown an embodiment of my invention, in which the shafts 15 and 26 are placed in substantially vertical alignment with each other, with the power shaft and driving disks and pistons above the abutments, still in certain cases it might be very desirable, or even preferable, to set the engine into some other position, as, for example, with the said shafts lying in the same horizontal plane, or inverted, the abutments and abutment shaft being located above the power shaft and driving disks and pistons.

Although I have herein shown and described a certain construction of valve mechanism and throttle mechanism, still I do not limit myself to the same except as I may do so in the claims. Neither do I limit myself to the construction of the driving disks and pistons and in the arrangement of the abutments except as I may do so in the claims. For example, in some cases it might be very desirable to use a construction in which each driving disk carries a piston extending in one direction only from one of its faces, and, manifestly, the same would be within the scope of the present invention.

It will be observed that the only movement of the valve sleeve is a rotary movement, and that the only movement of the reversing sleeves is a slight rocking movement in the reversing operation and a slight endwise movement in the throttling operation. In view of the foregoing facts, it is possible to so construct these parts as to secure an absolutely steam-tight construction, and one which will not wear appreciably after long service.

It is also to be observed that when operating in either direction, the live steam is cut off or isolated from the dead side at two points, namely, at the reversing sleeve and at the valve structure 145. Furthermore, the live steam may be cut off from both sides when the machine is standing idle, namely, at both of their reversing sleeves and at the valve structure 145. These features are of importance in a machine operating under very high pressures.

It is also to be observed that the machine herein disclosed is very perfectly balanced both as regards the pressure forces exerted therein, and the centrifugal and inertia forces. For example, each of the piston blocks extends to both sides of its driving disk, and, therefore, any distortional tendency on the piston block itself is eliminated. In like manner the steam pressure is simultaneously admitted to both sides of each driving disk, so that the pressures in the two directions are neutralized and balanced at all times. Other comparisons might be made, but it is believed that the foregoing are sufficient to show the balanced nature of the present construction.

I claim:

1. In a rotary engine, the combination of a power shaft, a plurality of driving disks thereon, a piston member on the peripheral portion of each driving disk and having piston portions extending from both of the faces thereof, an abutment shaft extending parallel to the power shaft, a pair of abutment disks on the abutment shaft corresponding to each driving disk, the abutment disks of each pair embracing the peripheral portion of the corresponding driving disk between their peripheral portions, and extending towards the axis of the driving shaft as far as the corresponding piston portion, there being a gate notch in each abutment disk for the corresponding piston portion, each gate notch aforesaid extending toward the axis of the abutment shaft radially as far as the outer face of the corresponding piston block, and a casing for the driving disks, pistons and abutment disks, said casing comprising a series of sections serving to provide circular piston chambers for the accommodation of the piston members in their circular travel, and also serving to provide a longitudinally extending bearing chamber concentric with the driving shaft, bearings in said chamber for supporting the driving shaft intermediate the driving disks, the abutment disks of each pair extending across the corresponding piston chambers, and serving to divide them at a point lying within the plane of the shafts, means causing the two shafts to rotate in synchronism, and for bringing the notches of the abutment disks into said plane at the time of arrival of the corresponding pistons therein, there being a port in the wall of each piston chamber at each side of said plane, valve mechanism in conjunction with said ports, and means for actuating said valve mechanisms in synchronism with the rotations of the power shaft.

2. In a rotary engine, the combination of a power shaft, a plurality of driving disks thereon, a piston member on the peripheral portion of each driving disk, an abutment shaft extending parallel to the power shaft, an abutment disk on the abutment shaft corresponding to each driving disk and having its peripheral portion adjacent to the peripheral portion of its driving disk and extending towards the axis of the driving shaft as far as the inner portion of the corresponding piston member, there being a gate notch in each abutment disk for the corresponding piston member, each gate notch aforesaid extending toward the axis of the abutment shaft radially as far as the outer face of the corresponding piston member, and a casing for the driving disks, pistons, and the abutment disks, said casing comprising a series of sections serving to provide circular piston chambers for the accommodation of the piston members in their circular travel, and also serving to provide a longitudinally extending bearing chamber concentric with the driving shaft, bearings in said chamber for supporting the driving shaft intermediate the driving disks, each abutment disk extending across the corresponding piston chamber, and serving to divide the same at a point lying within the plane of the two shafts, means causing the two shafts to rotate in synchronism and for bringing the notches of the abutment disks into said plane at the time of arrival of the corresponding pistons therein, there being a port in the wall of each piston chamber at each side of said plane, valve mechanism in conjunction with said ports, and means for actuating said valve mechanisms in synchronism with the rotations of the power shaft.

3. In a rotary engine, the combination of a power shaft, a plurality of driving disks thereon, a piston member on the peripheral portion of each driving disk, an abutment shaft extending parallel to the power shaft, an abutment disk on the abutment shaft corresponding to each driving disk and having its peripheral portion adjacent to the peripheral portion of its driving disk and extending towards the axis of the driving disk as far as the inner portion of the corresponding piston member, there being a gate notch in each abutment disk for the corresponding piston member, each gate notch aforesaid extending towards the axis of the abutment shaft radially as far as the outer face of the corresponding piston member, and a casing for the driving disks, pistons, and the abutment disks, said casing comprising a series of sections serving to provide circular piston chambers for the accommodation of the piston members in their circular travel, each abutment disk extending across the corresponding piston chamber and serving to divide the same at a point lying within the plane of the two shafts, means causing the two shafts to rotate in synchronism and for bringing the notches of the abutment disks into said plane at the time of arrival of the corresponding pistons therein, there being a port in the wall of each piston chamber at each side of said plane, valve mechanism in conjunction with said ports, and means for actuating said valve mechanisms in synchronism with the rotations of the power shaft.

4. In a rotary engine, the combination of a plurality of driving disks in conjunction with a suitable support therefor, a piston member on the peripheral portion of each driving disk, an abutment disk corresponding to each driving disk having its peripheral portion adjacent to the peripheral portion of its driving disk and extending towards the axis of rotation thereof as far as the inner portion of the corresponding piston member, there being a gate notch in each abutment disk for the corresponding piston member, each gate notch aforesaid extending towards the axis of rotation of the abutment disks radially as far as the outer face of the corresponding piston member, and a casing for the driving disks, pistons, and abutment disks, said casing comprising a series of sections serving to provide circular piston chambers for the accommodation of the piston members in their circular travel, each abutment disk extending across the corresponding piston chamber and serving to divide the same at a point lying within the plane of the axes of rotation of the driving disks and the abutment disks, means for causing all of said disks to rotate in synchronism and for bringing the notch of each abutment disk into said plane at the time of arrival of the corresponding piston therein, there being a port in the wall of each piston chamber at each side of said plane, valve mechanisms in conjunction with said ports, and means for actuating said valve mechanisms in synchronism with the rotations of the driving disks.

5. In a rotary engine, the combination of a circular piston chamber, a driving disk extending across said chamber and dividing the same into two portions, piston members on both sides of said disk and traveling respectively in the two portions of the chamber aforesaid, a pair of abutment disks mounted for rotation about another axis than the axis about which the disk aforesaid rotates and parallel thereto, each abutment disk normally extending across its portion of the piston chamber and dividing the same in steam-tight manner and having a suitable portion of its periphery of proper contour to pass the piston in its travel, means for causing the abutment disks to rotate in synchronism with the piston and disk, and suitable valve mechanism in conjunction with all of said parts.

6. A multi cylinder rotary engine comprising a plurality of circular co-axial piston chambers, pistons traveling therein, an operative connection between all of the pistons, traveling abutments in conjunction with the chambers for normally severing them and for passing the pistons at the appropriate intervals in their travels, in conjunction with valve mechanism at each side of the plane of division created by said abutments, each valve mechanism including a longitudinally extending passage parallel to the axis of rotation of the pistons, a port extending therefrom to each corresponding piston chamber, a continuous hollow reversing sleeve rockingly mounted within each passage and having a lip working against the face of the passage, and a port extending through said lip and adapted to at times register with the corresponding chamber port, a hollow rotary valve sleeve in each reversing sleeve and having a port adapted to at times register with each port of the reversing sleeve, means for causing both of the valve sleeves to rotate in synchronism with the pistons, and means for simultaneously moving the reversing sleeves to contrary positions in their respective passages.

7. A multi cylinder rotary engine comprising a plurality of circular co-axial piston chambers, pistons traveling therein, an operative connection between all of the pistons, traveling abutments in conjunction with the chambers for normally severing them and for passing the pistons at the appropriate intervals in their travels, in conjunction with valve mechanism at each side of the plane of division created by said abutments, each valve mechanism including a longitudinally extending passage parallel to the axis of rotation of the pistons, a port extending therefrom to each corresponding piston chamber, a continuous hollow reversing sleeve rockingly mounted within the passage, and working against the face of the passage, there being a port extending therethrough and adapted to at times register with the corresponding chamber port, a hollow rotary valve sleeve in each reversing sleeve and having a port adapted to at times register with each port of the reversing sleeve, means for causing both of the valve sleeves to rotate in synchronism with the pistons, and means for simultaneously moving the reversing sleeves to contrary positions in their respective passages.

8. A multi cylinder rotary engine comprising a plurality of arcuate piston chambers, pistons traveling therein, an operative connection between all of the pistons, traveling abutments in conjunction with the chambers for normally severing them and for passing the pistons at the appropriate intervals in their travels in conjunction with valve mechanism at each side of the plane of division created by said abutments, each valve mechanism including a longitudinally extending passage generally parallel to the axis of rotation of the pistons, a port extending therefrom to each corresponding piston chamber, a continuous hollow reversing sleeve rockingly mounted within each passage and working against the face thereof, and a port extending through the same and adapted to at times register with the corresponding chamber port, a hollow rotary valve sleeve in each reversing sleeve and having a port adapted to at times register with each port of the reversing sleeve, means for causing both of the valve sleeves to rotate in synchronism with the pistons, and means for simultaneously moving the reversing sleeves to contrary positions in their respective passages.

9. A multi cylinder rotary engine comprising a plurality of arcuate piston chambers, pistons traveling therein, an operative connection between all of the pistons, traveling abutments in conjunction with the chambers for normally severing them and for passing the pistons at the appropriate intervals in their travels in conjunction with valve mechanism at each side of the plane of division created by said abutments, each valve mechanism including a longitudinally extending passage generally parallel to the axis of rotation of the pistons, a port extending therefrom to each corresponding piston chamber, a continuous hollow reversing sleeve rockingly mounted within each passage and working against the face thereof, a port extending through the same and adapted to at times register with the corresponding chamber port, a hollow rotary valve sleeve in each reversing sleeve and having a port adapted to at times register with each port of the reversing sleeve, and means for causing both of the valve sleeves to rotate in synchronism with the pistons.

10. A multi cylinder rotary engine comprising a plurality of arcuate piston chambers, pistons traveling therein, an operative connection between all of the pistons, traveling abutments in conjunction with the chambers for normally severing them and for passing the pistons at the appropriate intervals in their travels in conjunction with valve mechanism adjacent to the plane of division created by said abutments and including a longitudinally extending passage generally parallel to the axis of rotation of the pistons, a port extending therefrom to each corresponding piston chamber, a continuous hollow reversing sleeve rockingly mounted within the passage and working against the surface thereof, a port extending through the same and adapted to at times register with the corresponding chamber port, a hollow rotary valve sleeve in the reversing sleeve and having a port adapted to at times register with the port of the reversing sleeve, and means for causing the valve sleeve to rotate in synchronism with the pistons.

11. A multi cylinder rotary engine comprising a plurality of arcuate piston chambers, pistons traveling therein, an operative connection between all of the pistons, traveling abutments in conjunction with the chambers for normally severing them and for passing the pistons at the appropriate intervals within their travels in conjunction with valve mechanism at each side of the plane of division created by said abutments, each valve mechanism including a longitudinally extending passage generally parallel to the axis of rotation of the pistons, a port extending therefrom to each corresponding piston chamber, concentric hollow reversing and valve sleeves within each of said passages, the reversing sleeves being continuous ports in both sleeves of each pair for at times simultaneously registering with the ports of their respective piston chambers, means for causing both of the valve sleeves to rotate in synchronism with the pistons, and means for simultaneously moving the reversing sleeves to contrary positions in their respective passages.

12. A multi cylinder rotary engine comprising a plurality of arcuate piston chambers, pistons traveling therein, an operative connection between all of the pistons, traveling abutments in conjunction with the chambers for normally severing them and for passing the pistons at the appropriate intervals within their travels in conjunction with valve mechanism at each side of the plane of division created by said abutments, each valve mechanism including a longitudinally extending passage generally parallel to the axis of rotation of the pistons, a port extending therefrom to each corresponding piston chamber, concentric hollow reversing and valve sleeves within each of said passages, the reversing sleeves being continuous ports in both sleeves of each pair for at times simultaneously registering with the ports of their respective piston chambers, and means for causing both of the valve sleeves to rotate in synchronism with the pistons.

13. A multi cylinder rotary engine comprising a plurality of arcuate piston chambers, pistons traveling therein, an operative connection between all of the pistons, the pistons being located at various angular positions with respect to their centers of rotation, traveling abutments in conjunction with the chambers for normally severing them and for passing the pistons at the appropriate intervals within their travels, in conjunction with valve mechanism at each side of the plane of division created by said abutments, each valve mechanism including a longitudinally extending passage generally parallel to the axis of rotation of the pistons, a port extending therefrom to each corresponding piston chamber, concentric hollow reversing and valve sleeves within each of said passages, the reversing sleeves being continuous ports in both sleeves of each pair for at times simultaneously registering with the ports of their respective piston chambers, the valve ports being located at various angular positions with respect to their axis of rotation for the purpose of successively admitting live steam to the proper chambers, and means for causing both of the valve sleeves to rotate in synchronism with the pistons.

14. A multi cylinder rotary engine comprising, in combination, a plurality of pistons, valve mechanism, and a casing therefor, said casing comprising a pair of end sections in conjunction with intermediate chamber sections, the end sections and chamber sections together providing co-axial circular piston chambers in conjunction with a concentric co-axial bearing chamber, the bearing chamber being separated from the piston chambers by a cylindrical partition, there being slotted openings in said partition between the bearing chamber and the piston chambers, and said sections providing a cylindrical abutment chamber adjacent to the bearing chamber and in communication with the various piston chambers, the pistons traveling in the piston chambers, a driving shaft extending axially through the first mentioned bearing chamber, piston connections therefrom to the various pistons through said slotted openings, bearings in said chamber for the driving shaft, an abutment shaft extending axially through the second mentioned cylindrical chamber, abutment members thereon working in said chamber in conjunction with the pistons aforesaid, and bearings in said chamber for the abutment shaft, all for the purpose specified.

15. A multi cylinder rotary engine comprising, in combination, a plurality of pistons, valve mechanism, and a casing therefor, said casing comprising a pair of end sections in conjunction with intermediate chamber sections, the end sections and chamber sections together providing co-axial circular piston chambers for the pistons in conjunction with a concentric co-axial bearing chamber, the bearing chamber being separated from the piston chambers by a cylinder partition, there being slotted openings in said partition between the bearing chamber and the piston chambers, the pistons traveling in the piston chambers, a driving shaft extending axially through the bearing chamber, piston connections therefrom to the various pistons through said slotted openings, bearings in said chamber for the bearing shaft, an abutment shaft, and abutments thereon working in conjunction with the pistons aforesaid, all for the purpose specified.

THOMAS CHARLTON.